United States Patent [19]

Dutton

[11] Patent Number: 4,887,308

[45] Date of Patent: Dec. 12, 1989

[54] BROADCAST DATA STORAGE AND RETRIEVAL SYSTEM

[76] Inventor: Bradley C. Dutton, 1033 S. Palmetto #J7, Ontario, Calif. 91762

[21] Appl. No.: 66,487

[22] Filed: Jun. 26, 1987

[51] Int. Cl.[4] .............................................. H04B 11/16

[52] U.S. Cl. .................................... 455/156; 455/186; 455/158; 455/68

[58] Field of Search .................... 365/45; 455/156, 70, 455/158, 1, 179, 185, 186, 154, 226, 68, 167

[56] References Cited

U.S. PATENT DOCUMENTS 4,521,914 6/1985 Petrovic .............................. 455/158

OTHER PUBLICATIONS

"Specification of the Radio Data System RDS for VHF/FM Sound Broadcasting", European Broadcasting Union, Tech. 3244-E, Mar. 1984, pp. 1-60.

*Primary Examiner*—Benedict V. Safourek
*Assistant Examiner*—Frederick R. Jorgenson
*Attorney, Agent, or Firm*—Roger A. Marrs

[57] ABSTRACT

An information storage and retrieval system is disclosed herein having a primary information storage for broadcast information that is selected and encoded for constant broadcast transmission. Such information may take the form of musical compositions including title, composer, artist data and the like. An emergency transmission network selectively transmits pre-set emergency information or data. A receiver is employed to receive both broadcast and emergency transmissions and decode the information for presentation on a visual display with emergency display superseding the broadcast display. A broadcast data hold and recall manual buttons are employed to store desired data in a memory and to subsequently recall such data at the command of the listener.

1 Claim, 1 Drawing Sheet

BROADCAST DATA STORAGE AND RETRIEVAL SYSTEM

BACKGROUND OF THE INVENTION

1. Field of the Invention

The present invention relates to information retrieval and display systems and more particularly to a novel system for storing identifying data pertaining to broadcast information such as songs, artists and composers thereof, including means for transmitting such information and displaying the information for the convenience of the radio operator.

2. Brief Description of the Prior Art

Oftentimes, the name of a song, as well as the artist performing the song, are not immediately broadcast by the announcer and it is difficult for the listener to remember or immediately identify the song and the artist at the time of listening. Generally, the announcer will provide a summary at the end of a group of musical selections identifying the song and the performing artist. However, unless the listener writes or otherwise makes a memory notation of the information, the listener does not have sufficient recall and cannot properly identify the song and the artist at a later time.

This is a particularly difficult problem when the receiver or radio is in an automobile since the driver is concentrating on the operating and driving procedures of the vehicle. Also, it is sometimes difficult for the vehicle operator to hear emergency sirens when an emergency vehicle is in close proximity inasmuch as the windows are normally closed on the vehicle and the broadcast volume prohibits hearing of the emergency signal or siren.

Therefore, a long standing need has existed to provide a novel information broadcasting system which will not only provide the radio listener with desired information concerning the song and the performing artist but which will override the normal broadcasting channel to indicate the presence of an emergency vehicle or emergency message. Such a system is desirable to function and operate without interference with the normal broadcast transmission and the normal reception of the broadcast by a receiver.

SUMMARY OF THE INVENTION

Accordingly, the above problems and difficulties are obviated by the present invention which provides a novel information storage and retrieval system applied to the broadcasting industry which includes a first broadcasting channel for disseminating normal broadcasting data. Such data may include musical compositions and the first broadcast channel includes a primary storage information means for storing information concerning the musical compositions such as performing artists, composer or the like. A select coded media circuit is provided for withdrawing the selected information from the storage means and for encoding the information for transmitting via a constant transmitter. Additionally, a second transmitting channel is provided, having preset coded information means storing conventional messages which are subsequently encoded for transmission by a periodic transmitter. The periodic transmitter is of the emergency type.

The system further includes a common transceiver which may be of the AM/FM type that will normally broadcast information for the listener's pleasure. The transceiver further includes a computer means 20 which includes a master decoder for receiving the selected information from the primary information storage means and for processing the information to a memory where it is held for future use by the listener. A hold broadcast data means is provided which is actuated by the listener to hold the selected information in the memory where it may be subsequently recalled by listener actuation of a manual recall means Upon recall, the special information which was originally held in the primary information storage means is displayed for viewing by the listener. Signals received from the second broadcast channel of an emergency nature are processed by the master decoder through a recognition circuit where selective action means are provided for overriding the broadcast display and the receiver itself so that only the emergency information received from the preset coded information means is displayed on a separate emergency display and heard audibly from the transceiver.

Therefore, it is among the primary objects of the present invention to provide a novel broadcast information storage and retrieval system whereby the radio listener may store information pertaining to the name of the song and the performing artist into a memory system and may subsequently recall this information at a later time.

Another object of the present invention is to provide a novel broadcast system whereby normal broadcast information as well as emergency broadcast information from another source will be accepted by a common receiver and wherein the normal audio of the receiver will be attenuated when an emergency signal is present.

Still a further object of the present invention is to provide a novel broadcast and receiving system whereby musical selection information pertaining to name of composition and performing artists are stored for subsequent display at the selection of the listener. Also included is an emergency receiving channel capable of overriding the normal broadcast so that the emergency information is displayed.

Yet another object of the present invention is to provide a novel broadcast and receiver system whereby prestored information serving as background information to the normal broadcast information is stored in the receiver for subsequent recall by the listener and wherein the recalled information is visually displayed for the listener.

Another object of the invention resides in a broadcast and receiver system wherein a multiple of broadcast transmissions are simultaneously emitted and received by multiple receivers that are compared with pre-set information such as artist and song title, resulting in a subsequent storage of the information after positive comparison.

Still a further object of the inventive concept resides in the ability of a radio listener to pre-select certain desired information such as artist and song title into a radio receiver memory and through the employment of a comparator, sense and record the desired information when transmitted and received by multiple transmitters and receivers respectively.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
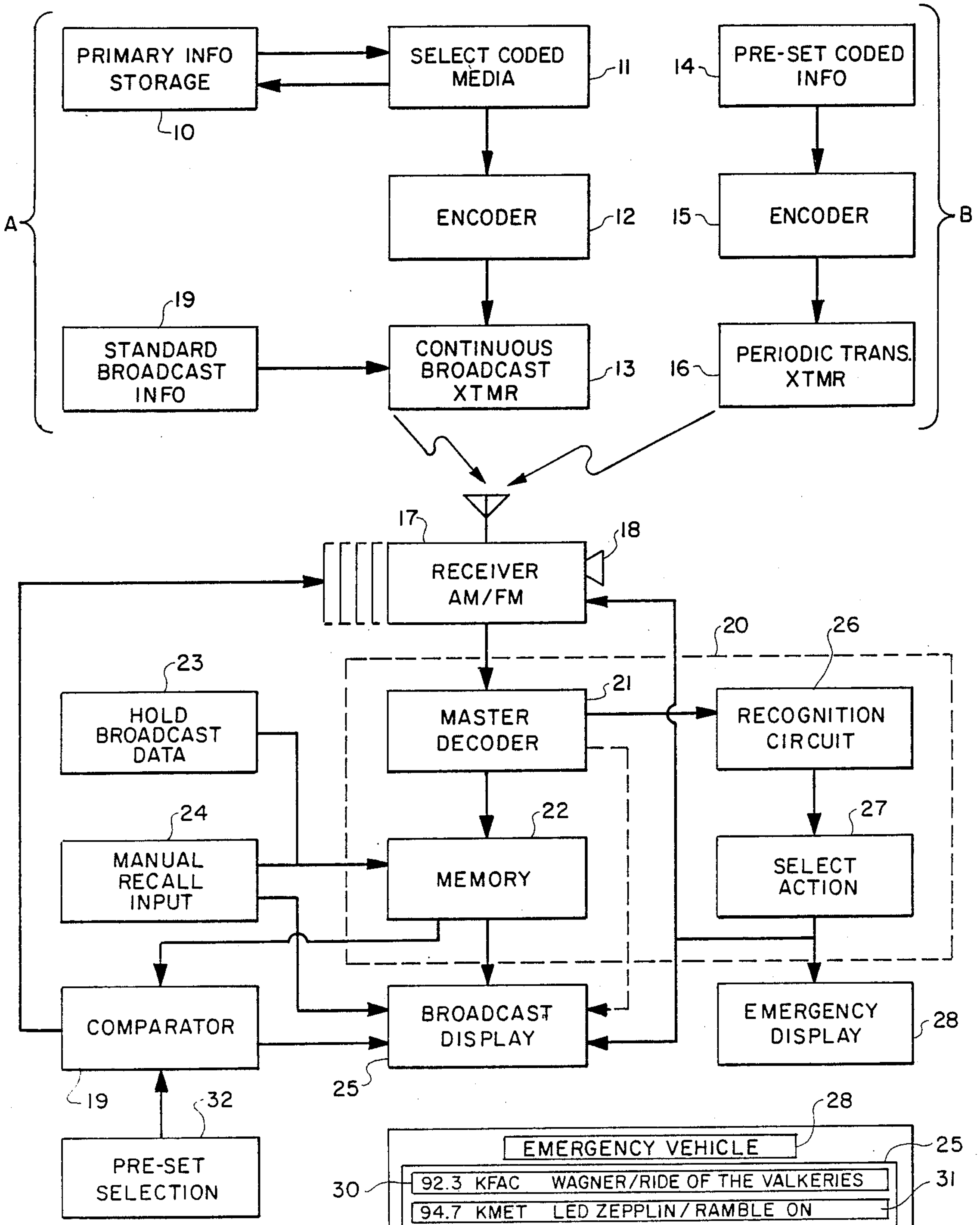
FIG. 1 is a block diagram illustrating the novel broadcast and receiver system used which incorporates the present invention.

Referring to FIG. 1, a novel broadcast transmitting and receiving system is illustrated in block diagram form wherein a first broadcast channel is indicated by the letter A and a second transmitting channel is indicated by letter B. In the first broadcast channel, primary information is entered into a storage means 10 that takes the form of special identification data referring to a specific subject matter. For example, the data stored in storage means 10 may include a plurality of musical selections having the artist and name of the composition entered into a proper storage media. As the broadcast of conventional programming is taking place, a portion of the stored data is selected by a select coded media means 11 and is encoded by an encoder means 12 for introduction into the standard programming information being broadcast by a constant broadcast transmitter 13. Therefore, the transmission includes not only the normal broadcasting data 19 such as the musical composition itself but coded information containing the composition name, performing artist, composer or the like. It should be understood that the broadcast programming being transmitted via channel A is of a continuous nature with normal programming intended to be heard by the listener with the selected information from storage means 10 being coded, such as by special frequency, not normally heard by the listener.

With respect to broadcast channel B, preset information is stored in a coded means 14 and such preset information relates to emergency situations. The coded information may be of any alpha-numeric code relating to fire, police, ambulance or other type of emergency situation. Upon actuation, in the event of an emergency situation, the preset coded information stored in block 14 will be encoded by an encoder 15 for introduction to transmitter 16 which broadcasts the emergency programming simultaneously with the broadcast programming transmitted by transmitter 13. The emergency transmitter is periodic in that its transmission is not continuous for a long period of time. The periodic transmission may be for a duration of from one minute to five minutes; however, transmission will occur at a different frequency from the frequency of the normal program broadcast via channel A.

Both broadcast transmissions from Channels A and B will be received by an antenna coupled to multiple receivers as conventional AM/FM radio receiver 17. The normal broadcast transmission will be made audible and projected from a loudspeaker 18 so that the listener will hear the normal broadcast. The receiver 17 may be conveniently located in the home, office or may be mobile in a vehicle such as an automobile or a boat.

A computer means 20 is included in the conventional radio receiver 17 which includes a master decoder 21 for receiving the broadcasting signals transmitted from channels A and B where decoding separates the signals from each of the respective channels into two groups. The first group representing the broadcasting information from channel A is introduced into a memory 22 at the discretion of the listener. When the listener hears a musical composition of interest where he wishes to learn of the musical composition's name, performing artist and other information, a hold broadcast data means 23 is actuated so that the master decoder 21 will introduce the broadcast selected coded information from the primary information storage 10 into the memory 22. As additional musical selections occur, the listener can activate the hold broadcast data means 23 again to store the desired information into the memory 22. At a later time, a manual recall means 24 is actuated to retrieve or withdraw the selected information in memory 22 for presentation on a broadcast display via a comparator 19. The comparator 19 is operably disposed between the multiple receivers and the memory so that positive matching of information triggers withdrawal of the information for display on the broadcast display 25. The listener may pre-set information into the comparator for comparison with broadcast information by manually introducing the information into the comparator via a plurality of entry keys, such as key 29. These keys show alpha/numeric characters capable of producing names and titles of desired musical selections or the like.

The listener can change station of broadcast reception by depressing station buttons such as button 32 which operates through the comparator to re-set the receivers.

However, when emergency transmission is received via broadcast channel B, the master decoder 21 will transmit a signal to a recognition circuit 26 and to the broadcast display 28 that actuates an action signal from select action means 27 for interrupting the broadcast display 25 and for attenuating or terminating the normal broadcast transmission from channel A at the receiver 17 Therefore, only the emergency information will be presented at an emergency display 28.

Figure 2:
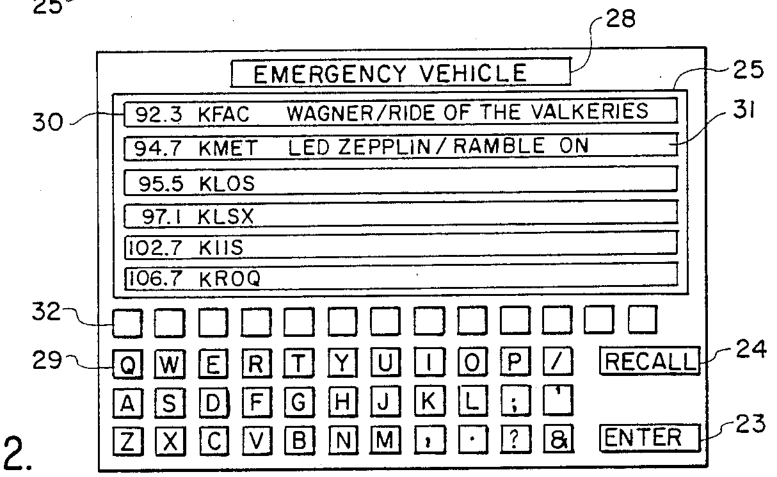
FIG. 2 is a diagrammatic drawing of a display means for visually presenting emergency signals and for presenting special broadcast information concerning the normal broadcast data which is used in the system of FIG. 1.

Referring now in detail to FIG. 2, a diagrammatic drawing is presented showing a broadcast display 25 that may take the form of a window 30 for identifying station frequency to which the receiver 17 is tuned, including an elongated information line 31 presenting song title and artist or performer information. A plurality of windows is provided so that the listener has a substantial amount or number of musical selections that may be carried into the memory 22 and that may be recalled onto the display by the manual recall means 24. In one form of the invention, the hold broadcast data means may be a simple pushbutton 23, while a similar type of button may be used for the manual recall means 24. The information may be displayed in the windows 28, 30 and 31 by any suitable means such as liquid crystals or other electronic display means.

Therefore, in the simplest usage of the invention, it can be seen from the foregoing that a standard broadcast transmission via channel A is introduced to multiple receivers 17 which includes not only the usual broadcast data such as musical compositions, but also includes coded information pertaining to the artist, performer, composer or the like. Such coded information is decoded after reception by the master decoder 21 and the information is placed into a storage memory 22 at the selection of the listener via the hold broadcast data means 23. At the listener's convenience, the data selected may be recalled for display purposes by actuation of the manual recall means 24 and the information is displayed in the windows 30 and 31 on the display 25.

Emergency information coming from channel B will also be received by the receiver 17 and such information will be recognized by the circuit 26 whereupon an actuation signal from the select action means 27 will be introduced to the receiver 17 so as to block out the broadcast information coming from channel A and to the broadcast display 25 so as to block out the display leaving only the emergency information presented on the display 28. The emergency display may be of any nature such as a flashing red light, special instructions pertaining to the emergency, and it is to be understood that an audible alarm may also be incorporated into the visual display for attracting the attention of the listener.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A broadcast data storage and retrieval system comprising:

a continuous broadcast transmitting means radiating programming data;

said programming data composed of general programming data and selected coded data related to said general programming data;

receiver means for receiving said programming means;

data storage means operably coupled to said receiver means for storing said selected coded data;

display means connected to said data storage means including a visual display;

manually operated means selectively coupled to said data storage means for transferring said selected coded data from said storage means to said display means;

said manually operated means comprises a hold broadcast data means coupled to said data storage means for selectively introducing said selected coded data of said programming data into said storage means and a manual recall means coupled to said data storage means for transferring said selected coded data from said data storage means to said display means;

a periodic transmitting means radiating emergency information;

recognition circuits in said receiver responsive to reception of said emergency information for suppression of said programming data and the display thereof by said display means; and said display means further includes a separate display for said emergency information.

* * * * *